(12) United States Patent
Kitamoto et al.

(10) Patent No.: US 10,967,757 B2
(45) Date of Patent: Apr. 6, 2021

(54) CONTROL APPARATUS FOR VEHICLE PLANT

(71) Applicant: HONDA MOTOR CO., LTD., Tokyo (JP)

(72) Inventors: Ryota Kitamoto, Wako (JP); Yukihiro Nozaki, Hanno (JP); Yasuhiro Maeda, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 16/183,006

(22) Filed: Nov. 7, 2018

(65) Prior Publication Data

US 2019/0143839 A1   May 16, 2019

(30) Foreign Application Priority Data

Nov. 10, 2017   (JP) .............................. JP2017-217725

(51) Int. Cl.
| | |
|---|---|
| *B60L 58/30* | (2019.01) |
| *H01M 8/04537* | (2016.01) |
| *B60L 3/00* | (2019.01) |
| *B60L 58/40* | (2019.01) |
| *B60L 3/12* | (2006.01) |
| *B60L 50/75* | (2019.01) |

(52) U.S. Cl.
CPC .............. *B60L 58/30* (2019.02); *B60L 3/0053* (2013.01); *B60L 3/12* (2013.01); *B60L 50/75* (2019.02); *B60L 58/40* (2019.02); *H01M 8/04649* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,838,854 B2 * | 1/2005 | Inagaki | G05B 5/01 318/701 |
| 2008/0182138 A1 * | 7/2008 | Salvador | H01M 8/04955 429/429 |

(Continued)

FOREIGN PATENT DOCUMENTS

JP  4459566 B2  4/2010

*Primary Examiner* — Jelani A Smith
*Assistant Examiner* — Alexander C. Bost
(74) *Attorney, Agent, or Firm* — Westerman, Hattori, Daniels & Adrian, LLP

(57) ABSTRACT

A control apparatus for a vehicle plant, which is capable of reducing computational load and a storage capacity in a case where the vehicle plant is controlled using a plurality of periodic function values having a plurality of frequencies different from each other. A control apparatus for a fuel cell device includes a first ECU and a second ECU. The second ECU calculates superposition sine wave value of one of frequencies Z to nZ (Hz) based on a frequency command value by a thinning method using a data group of one set of reference sine wave values, stored in a map. The second ECU executes an AC superposition control using the superposition sine wave value, and calculates impedance of the fuel cell device during execution of the AC superposition control. The first ECU executes fuel cell (FC) humidification control process such that the impedance becomes equal to a target value.

7 Claims, 13 Drawing Sheets

| DATA No. | | 1 | 2 | 3 | 4 | 5 | 6 | 7 | 8 | 9 | 10 | 11 | 12 | 13 | 14 | 15 | 16 | 17 | Fr_cmd | READOUT METHOD |
|---|---|---|---|---|---|---|---|---|---|---|---|---|---|---|---|---|---|---|---|---|
| DATA AMPLITUDE VALUE | | 0 | -1 | -2 | -3 | -4 | -3 | -2 | -1 | 0 | 1 | 2 | 3 | 4 | 3 | 2 | 1 | 0 | | |
| FREQUENCY (Hz) | Z | O | O | O | O | O | O | O | O | O | O | O | O | O | O | O | O | O | 1 | ALL DATA ITEMS |
| | 2Z | O | - | O | - | O | - | O | - | O | - | O | - | O | - | O | - | O | 2 | EVERY SECOND DATA ITEM |
| | 3Z | O | - | - | O | - | - | O | - | - | O | - | - | O | - | - | O | - | 3 | EVERY THIRD DATA ITEM |
| | 4Z | O | - | - | - | O | - | - | - | O | - | - | - | O | - | - | - | O | 4 | EVERY FOURTH DATA ITEM |
| | ⋮ | | | | | | | | | | | | | | | | | | ⋮ | ⋮ |
| | nZ | | | | | | | | | | | | | | | | | | n | EVERY n-1 DATA ITEM |

(56) References Cited

U.S. PATENT DOCUMENTS

| | | | |
|---|---|---|---|
| 2012/0019255 A1* | 1/2012 | Rea | H01M 8/04552 |
| | | | 324/436 |
| 2013/0189595 A1* | 7/2013 | Izuhara | H01M 8/04955 |
| | | | 429/413 |
| 2015/0207158 A1* | 7/2015 | Nanba | H01M 8/04067 |
| | | | 429/442 |
| 2016/0240875 A1* | 8/2016 | Rama | H01M 8/04179 |
| 2018/0026287 A1* | 1/2018 | Hasegawa | H01M 8/04559 |
| | | | 429/432 |
| 2018/0198140 A1* | 7/2018 | Eichberger | G01R 31/396 |
| 2019/0064282 A1* | 2/2019 | Haga | B60L 3/12 |
| 2019/0074526 A1* | 3/2019 | Chikugo | H01M 8/04753 |

* cited by examiner

REFERENCE SINE WAVE VALUE MAP

| DATA No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| DATA AMPLITUDE VALUE | 0 | −1 | −2 | −3 | −4 | −3 | −2 | −1 | 0 | 1 | 2 | 3 | 4 | 3 | 2 | 1 | 0 |

Usin_b (Fr_cmd=1)

FIG. 6

| DATA No. | 1 | 2 | 3 | 4 | 5 | 6 | 7 | 8 | 9 | 10 | 11 | 12 | 13 | 14 | 15 | 16 | 17 | Fr_cmd | READOUT METHOD |
|---|---|---|---|---|---|---|---|---|---|---|---|---|---|---|---|---|---|---|---|
| FREQUENCY (Hz) | 0 | -1 | -2 | -3 | -4 | -3 | -2 | -1 | 0 | 1 | 2 | 3 | 4 | 3 | 2 | 1 | 0 | | |
| DATA AMPLITUDE VALUE — Z | ○ | ○ | ○ | ○ | ○ | ○ | ○ | ○ | ○ | ○ | ○ | ○ | ○ | ○ | ○ | ○ | ○ | 1 | ALL DATA ITEMS |
| 2Z | ○ | - | ○ | - | ○ | - | ○ | - | ○ | - | ○ | - | ○ | - | ○ | - | ○ | 2 | EVERY SECOND DATA ITEM |
| 3Z | ○ | - | - | ○ | - | - | ○ | - | - | ○ | - | - | ○ | - | - | ○ | - | 3 | EVERY THIRD DATA ITEM |
| 4Z | ○ | - | - | - | ○ | - | - | - | ○ | - | - | - | ○ | - | - | - | ○ | 4 | EVERY FOURTH DATA ITEM |
| ... | | | | | | | | | | | | | | | | | | ... | ... |
| nZ | | | | | | | | | | | | | | | | | | n | EVERY n-1 DATA ITEM |

CONTROL APPARATUS FOR VEHICLE PLANT

BACKGROUND OF THE INVENTION

Field of the Invention

The present invention relates to a control apparatus for a vehicle plant installed on a vehicle.

Description of the Related Art

Conventionally, the present applicant has proposed a control apparatus in Japanese Patent Publication No. 4459566. This control apparatus performs failure determination of an exhaust gas sensor provided in an exhaust passage of a vehicle, and executes a failure determination process shown in FIG. 3 of Japanese Patent Publication No. 4459566.

In this failure determination process, when predetermined detection conditions are satisfied, a detection-use signal value KIDSIN is calculated by adding an offset value to a trigonometric function wave having a predetermined frequency, and a fuel injection amount IJN is calculated by multiplying a basic fuel injection amount by the detection-use signal value KIDSIN. The amount of fuel corresponding to the fuel injection amount IJN is supplied to an engine via an injector.

Then, a filtered value KACT_F is calculated by performing a band-pass filtering process on a detection output KACT of the exhaust gas sensor, and an integral value LAF_DLYP is calculated by integrating the absolute value KACT_FA of the filtered value. When the integral value LAF_DLYP is not smaller than a predetermined value LAF_DLYP_OK, it is determined that the exhaust gas sensor is not faulty, and otherwise it is determined that the exhaust gas sensor is faulty.

As a control apparatus for a plant, there has been proposed one that detects dynamic characteristics and an operating state of the plant using a plurality of periodic function values having a plurality of respective frequencies different from each other, for controlling the plant based on the results of the detection. In a case where the method proposed in Japanese Patent Publication No. 4459566 is applied to such a control apparatus, a storage capacity is increased in order to store the plurality of periodic function values, and computational load as well is increased. Particularly, in the case of a control apparatus for controlling a vehicle plant, the computational performance and storage capacity thereof is limited since the control apparatus is installed on a vehicle. Therefore, in the case of controlling the vehicle plant, when a plurality of periodic function values are used, it is necessary to reduce the computational load and storage capacity of the control apparatus.

SUMMARY OF THE INVENTION

It is an object of the present invention to provide a control apparatus for a vehicle plant, which is capable of reducing computational load and a storage capacity in a case where the vehicle plant is controlled using a plurality of periodic function values having a plurality of frequencies different from each other.

To attain the above object, the present invention provides a control apparatus control apparatus for a vehicle plant installed on a vehicle, comprising storage means for storing a data group of one set of reference periodic function values having a predetermined reference frequency, periodic function value generation means configured to be capable of generating n periodic function values having n frequencies (n represents an integer), which are an integer times as high as the reference frequency and different from each other, using the data group of the one set of reference periodic function values stored in the storage means, the periodic function value generation means selectively generating one of the n periodic function values as a selected periodic function value, electric signal generation means electrically connected to the vehicle plant, for generating an electric signal including the selected periodic function value as a component, using an output from the vehicle plant, operating state parameter acquisition means for acquiring an operating state parameter indicative of an operating state of the vehicle plant at a time when the electric signal is being generated, and control means for controlling the vehicle plant using the operating state parameter, wherein the periodic function value generation means generates one of the n periodic function values by using the data group of the one set of reference periodic function values as it is, and generates n−1 periodic function values other than the one periodic function value by periodically thinning out the data group of the one set of reference periodic function values.

According to this control system for a vehicle plant, the n periodic function values having the n (n represents an integer) frequencies, which are an integer times as high as the reference frequency and different from each other, can be generated using the data group of the one set of reference periodic function values stored in the storage means, and one of the n periodic function values is selectively generated as a selected periodic function value. Then, the electric signal having the generated selected periodic function value as a component is generated by the electric signal generation means electrically connected to the vehicle plant using the output from the vehicle plant. When the electric signal is being generated, the operating state parameter indicative of the operating state of the vehicle plant is acquired, and the vehicle plant is controlled using the operating state parameter. In this case, one of the n periodic function values is generated by using the data group of the one set of reference periodic function values as it is, and the n−1 periodic function values other than the one periodic function value are generated using the data group of the one set of reference periodic function values by periodically thinning out the same. Therefore, it is possible to reduce computational load when the n periodic function values are generated. In addition to this, since the storage means is only required to have a capacity capable of storing only the data group of the one set of reference periodic function values, it is possible to reduce the storage capacity of the storage means. Further, in a case where the functions of the control apparatus are ported to another control apparatus, it is not required to port a large number of data items, whereby the functions can be easily ported, and hence the versatility can be enhanced. From the above, in the case where the vehicle plant is controlled, it is possible to enhance the versatility and use the periodic function values having the n frequencies different from each other, while reducing the computational load and the storage capacity. This makes it possible to improve marketability.

Preferably, the electric signal is configured as an AC signal, and the operating state parameter is an AC signal value output from the vehicle plant, the control apparatus further comprising filtered value calculation means for calculating a filtered value by performing a predetermined filtering process on the AC signal value, wherein the control means controls the vehicle plant by using the filtered value, and wherein the predetermined filtering process is configured to include a predetermined passband, with an upper limit value of the predetermined passband being set such that the upper limit value has a higher frequency as a frequency of the selected periodic function value is higher.

With the configuration of the preferred embodiment, the filtered value is calculated by performing the predetermined filtering process on the AC signal value output from the vehicle plant, and the vehicle plant is controlled by using the filtered value. In this case, the predetermined filtering process is configured to include the predetermined passband, and the upper limit value of the predetermined passband is set such that it has a higher frequency as the frequency of the selected periodic function value is higher, so that it is possible to calculate the filtered value as a value obtained by efficiently extracting only a component ascribable to the selected periodic function value from the electric current value, while properly cutting noise components therefrom. Therefore, by controlling the vehicle plant using such a filtered value, it is possible to improve the control accuracy.

Preferably, the periodic function values are configured as sine function values or cosine function values, the electric signal is configured as an AC signal, and the operating state parameter is an AC signal value output from the vehicle plant, the control apparatus further comprising amplitude acquisition means for acquiring an amplitude of the AC signal value based on a slope value representing a slope of the AC signal value, wherein the control means controls the vehicle plant by using the amplitude, wherein after a sign of the slope represented by the slope value has been inverted from a state in which the slope continued to have the same sign a predetermined number of times or more, when the slope having the inverted sign continues the predetermined number of times or more, the amplitude acquisition means sets an AC signal value at a time of inversion of the sign as one of a maximum value and a minimum value based on a direction of the inversion of the sign, acquires the amplitude as a difference between the maximum value and the minimum value, and sets the predetermined number of times to a smaller value as the frequency of the selected periodic function value is higher.

With the configuration of the preferred embodiment, the AC signal value output from the vehicle plant is acquired. The amplitude of the AC signal value is acquired based on the slope value representing the slope of the AC signal value, and the vehicle plant is controlled using the amplitude. In this case, after the sign of the slope represented by the slope value has been inverted from the state in which the slope continued to have the same sign a predetermined number of times or more, when the slope having the inverted sign continues the predetermined number of times or more, the AC signal value at the time of inversion of the sign is set as one of the maximum value and the minimum value based on the direction of the inversion of the sign, and the amplitude is acquired as the difference between the maximum value and the minimum value. Since the predetermined number of times is set to a smaller value as the frequency of the selected periodic function value is higher, it is possible to accurately acquire the amplitude according to the frequency of the selected periodic function value. Therefore, by controlling the vehicle plant using such an amplitude, it is possible to improve the control accuracy.

Preferably, the vehicle plant is a fuel cell device, the electric signal generation means generates an AC signal as the electric signal, the operating state parameter acquisition means acquires impedance of a fuel cell stack when the AC signal is being generated, as the operating state parameter, and the control means controls the fuel cell device such that the impedance becomes equal to a predetermined target value.

With the configuration of the preferred embodiment, when the AC signal is being generated as the electric signal by the electric signal generation means, the impedance of the fuel cell stack is acquired, and hence it is possible to acquire the impedance using the selected periodic function value, which is one of the n periodic function values. Therefore, by properly selecting the selected periodic function value, it is possible to improve the acquisition accuracy of the impedance, thereby making it possible to improve the control accuracy of the fuel cell device.

More preferably, the operating state parameter acquisition means acquires a plurality of the impedances of a plurality of portions of the fuel cell stack, respectively, when the AC signal is being generated.

With the configuration of the preferred embodiment, when the AC signal is being generated, the plurality of the impedances of the plurality of portions of the fuel cell stack are acquired, respectively, so that in a case where a problem has occurred with one of the plurality of portions of the fuel cell stack, it is possible to properly identify the portion with which the problem has occurred, using the plurality of impedances.

The above and other objects, features, and advantages of the present invention will become more apparent from the following detailed description taken in conjunction with the accompanying drawings.

BRIEF DESCRIPTION OF THE DRAWINGS

FIG. 6 is a table showing a method of reading out data from the reference sine wave value map when the frequency command value is equal to 1 to n;

DETAILED DESCRIPTION OF PREFERRED EMBODIMENTS

Figure 1:
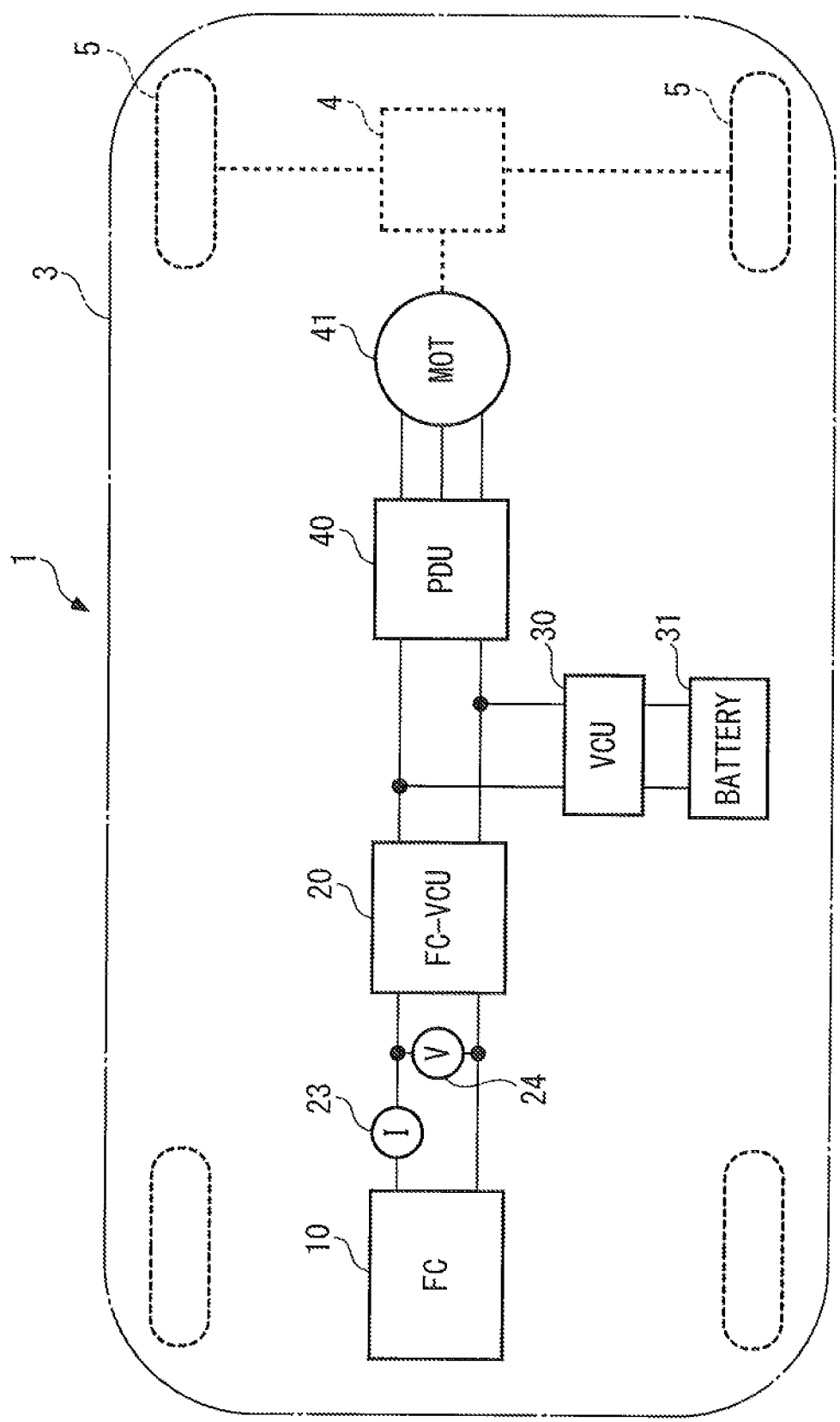
FIG. 1 is a diagram schematically showing a control apparatus according to an embodiment of the present invention, and a drive system of a vehicle which uses a fuel cell device having the control apparatus applied thereto, as a motive power source.

Hereafter, a control apparatus for a vehicle plant according to an embodiment of the invention will be described with reference to drawings. As shown in FIG. 1, the control apparatus 1 of the present invention controls a fuel cell device (denoted by "FC" in FIG. 1) 10 as the vehicle plant. The fuel cell device 10 is installed on a vehicle 3 as a motive power source. Note that in FIG. 1, a configuration indicated by broken lines shows a mechanically connected structure.

Figure 2:
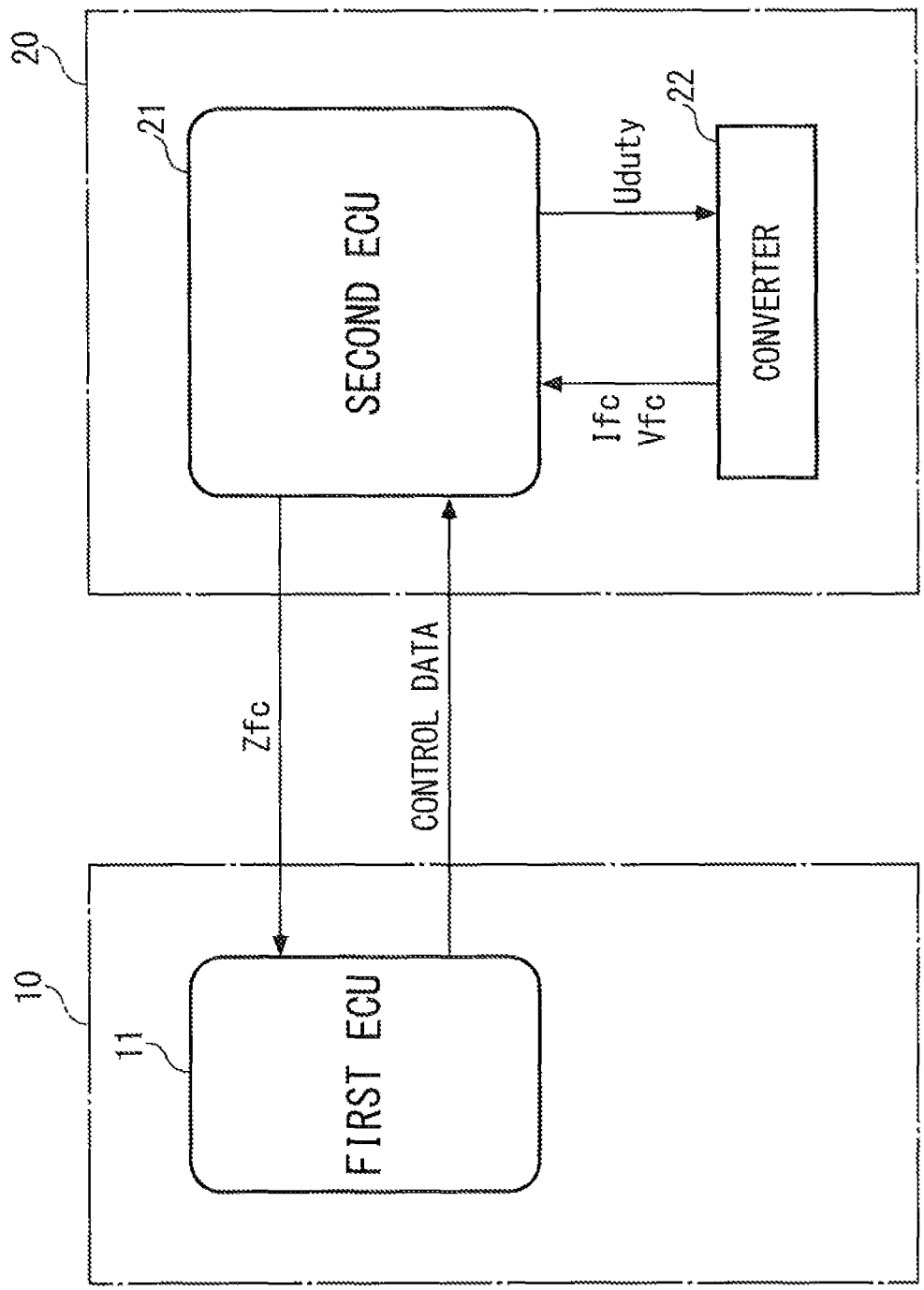
FIG. 2 is a block diagram showing the electrical configuration of the control apparatus.

The fuel cell device 10 includes a fuel cell stack, a hydrogen tank, a hydrogen pump, an air pump (none of which are shown), and so forth, and in addition thereto, a first ECU 11 appearing in FIG. 2.

The first ECU 11 (control means) is implemented by a microcomputer comprised of a CPU, a RAM, a ROM, and an I/O interface (none of which are shown), and causes hydrogen to be supplied from the hydrogen tank to the fuel cell stack by driving the hydrogen pump, and causes air to be supplied to the fuel cell stack by driving the air pump, whereby a moisture content, i.e. impedance of the fuel cell stack is controlled.

Further, the first ECU 11 calculates control data, such as a frequency command value Fr_cmd, referred to hereinafter, according to an operating state of the vehicle 3, and outputs the result of calculation to a second ECU 21, referred to hereinafter.

The fuel cell stack, which is formed by laminating a large number of cells, takes in hydrogen supplied from the hydrogen pump and oxygen from the air, and causes the hydrogen and the oxygen to chemically react with each other, to thereby perform a power generating operation. Electric power generated by the fuel cell stack is supplied to a battery 31 or an electric motor 41 e.g. via an FC-VCU 20, referred to hereinafter.

The vehicle 3 includes the FC-VCU 20, a VCU 30, the battery 31, a PDU 40, and the electric motor 41 in addition to the fuel cell device 10.

As shown in FIG. 2, the FC-VCU 20 includes the second ECU 21 and a converter 22. The second ECU 21 is implemented by a microcomputer similar to the first ECU 11, and as described hereinafter, controls the electric power generated by the fuel cell device 10 by driving the converter 22. Note that in the present embodiment, the second ECU 21 corresponds to storage means, periodic function value generation means, operating state parameter acquisition means, control means, filtered value calculation means, and amplitude acquisition means.

The converter 22 (electric signal generation means) is a multiphase converter, and includes a large number of conversion sections for converting the electric power generated by the fuel cell device 10 to voltage. The converter 22 increases the voltage generated by the fuel cell device 10 by performing on-off control (duty control) of switching elements of the conversion sections.

As shown in FIG. 1, a current sensor 23 and a voltage sensor 24 are provided between the fuel cell device 10 and the FC-VCU 20. The current sensor 23 detects an AC current Ifc flowing from the fuel cell device 10 to the FC-VCU 20, and the voltage sensor 24 detects an output voltage Vfc of the fuel cell device 10. The current Ifc and the voltage Vfc are input to the second ECU 21 via the converter 22. Note that in the present embodiment, the current sensor 23 corresponds to the operating state parameter acquisition means, and the electric current Ifc corresponds to an output from the vehicle plant, and an operating state parameter, and an AC signal value.

The second ECU 21 calculates an impedance Zfc (operating state parameter) of the fuel cell stack based on the electric current Ifc and the voltage Vfc, by a method, described hereinafter, and outputs the result of calculation to the first ECU 11. Further, as will be described hereinafter, the second ECU 21 calculates a duty signal value Uduty supplied to the converter 22, based on control data input from the first ECU 11.

Further, the above-mentioned VCU 30 incorporates a DC/DC converter, and controls the supply and receipt of electric power between the fuel cell device 10 and the electric motor 41, and the battery 31, while performing a step-up/step-down operation. Specifically, the VCU 30 reduces the voltage of electric power generated by the fuel cell device 10 and the voltage of electric power regenerated by the electric motor 41 to charge the battery 31 with the electric power, and increases the voltage of electric power of the battery 31 to supply the electric power to the electric motor 41. The battery 31 is implemented by a lithium ion-type battery.

Furthermore, the aforementioned PDU 40 incorporates an inverter, and when performing powering control of the electric motor 41, converts DC current from the fuel cell device 10 and/or the battery 31 to AC current, and supplies the AC current to the electric motor 41. On the other hand, when performing regeneration control of the electric motor 41 during deceleration travel of the vehicle 3, the PDU 40 converts AC current generated by the electric motor 41 to DC current, and charges the battery 31 with the DC current.

Further, the electric motor 41 is mechanically connected to drive wheels 5 and 5 via a transmission 4. When the powering control of the electric motor 41 is being performed, the motive power of the electric motor 41 is transmitted to the drive wheels 5 and 5, whereby the vehicle 3 is caused to travel.

Figure 3:
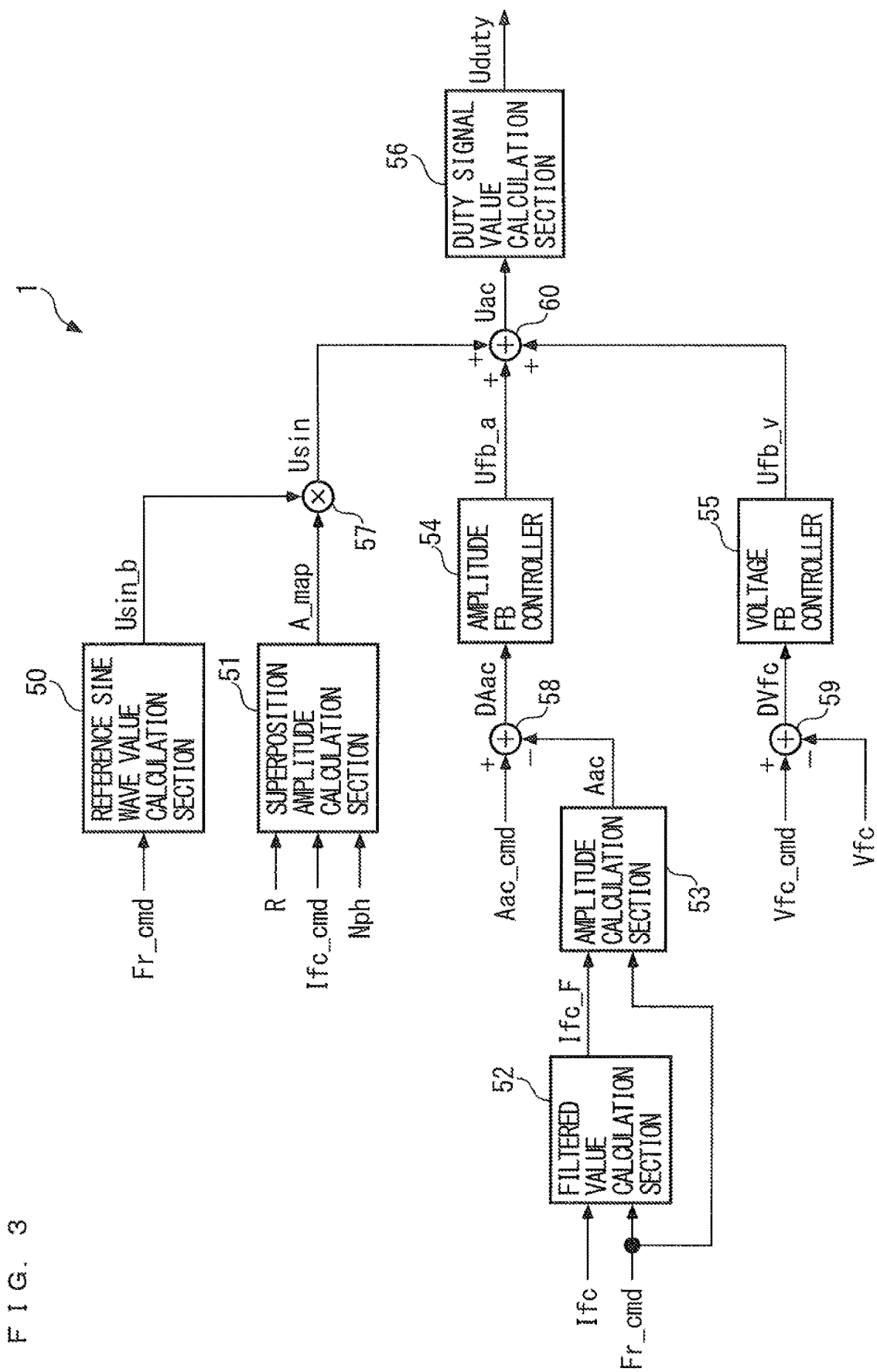
FIG. 3 is a block diagram showing the functional configuration of the control apparatus.

Next, the functional configuration of the control apparatus 1 of the present embodiment will be described with reference to FIG. 3. As shown in FIG. 3, the control apparatus 1 is comprised of a reference sine wave value calculation section 50, a superposition amplitude calculation section 51, a filtered value calculation section 52, an amplitude calculation section 53, an amplitude FB controller 54, a voltage FB controller 55, a duty signal value calculation section 56, an multiplier 57, two subtractors 58 and 59, and an adder 60. These elements 50 to 60 are all implemented by the second ECU 21.

First, the reference sine wave value calculation section 50 calculates a reference sine wave value Usin_b by a method, described hereinafter, using a reference sine wave value map stored in a ROM of the second ECU 21, based on the frequency command value Fr_cmd included in the control data from the first ECU 11. The frequency command value Fr_cmd is selectively set to one of values 1 to n (n represents an integer) by the first ECU 11. Note that in the present embodiment, the reference sine wave value calculation section 50 corresponds to the storage means and the periodic function value generation means, and the reference sine wave value Usin_b correspond to a periodic function value and a selected periodic function value.

Figures 4A, 4B:
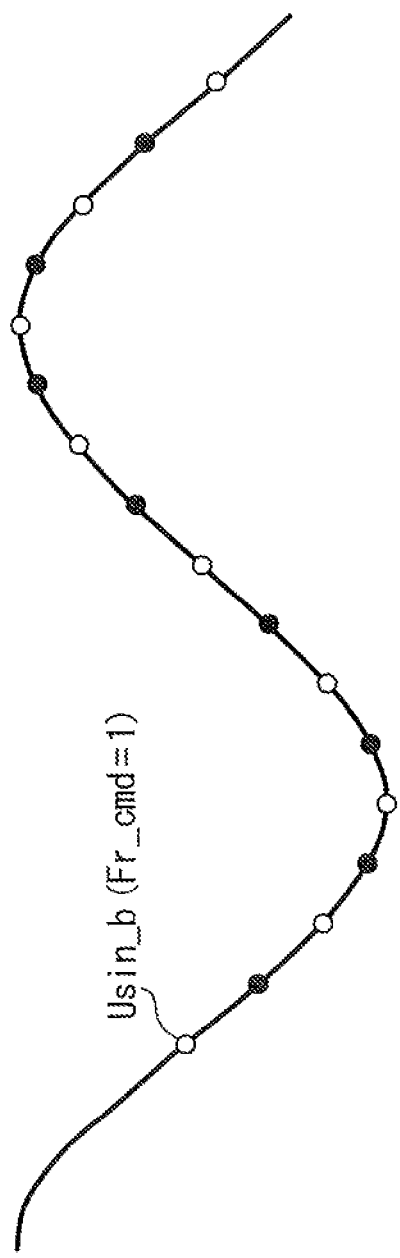
FIG. 4A is a diagram showing an example of a reference sine wave value map.
FIG. 4B is a diagram showing an example of reference sine wave values generated when a frequency command value is equal to 1.

Data of the reference sine wave value map is set as shown in FIG. 4A, for example. In the case of FIG. 4A, the number of data Nos. (=1 to 17) and the number of data amplitude values (=−4 to +4) are set to values smaller than their actual values, for ease of understanding.

As shown in FIG. 4A, in the reference sine wave value map, only a data group of one set of data items is set, and when the frequency command value Fr_cmd is equal to 1, map data of a reference sine wave is read out, as it is, at a predetermined control period ΔTk (e.g. 10 msec). With this, as shown in FIG. 4B, when Fr_cmd=1 holds, the reference sine wave having a predetermined frequency Z (Hz), composed of the reference sine wave values Usin_b, is generated.

Figure 5:
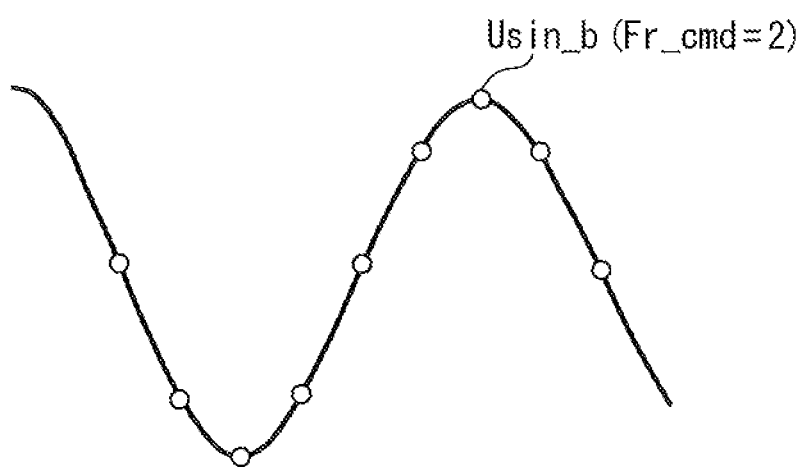
FIG. 5 is a diagram showing an example of reference sine wave values generated when the frequency command value is equal to 2.

On the other hand, when the frequency command value Fr_cmd is equal to 2, the value of each odd data number (data Nos.) (1, 3, 5 . . . ) is read out at the predetermined control period ΔTk, whereby as shown in FIG. 5, a reference sine wave composed of data of reference sine wave values Usin_b indicated by white circles in FIG. 4B is generated. In this case, every other map data item appearing in FIG. 4A is read out, whereby the reference sine wave is generated at a frequency of 2Z (Hz). In other words, when Fr_cmd=2 holds, every other data item is periodically left out from the data group shown in FIG. 4A, whereby the reference sine wave is generated at a frequency twice as high as when Fr_cmd=1 holds.

Further, when the frequency command value Fr_cmd=3 holds, every third map data item appearing in FIG. 4A is periodically read out, whereby the reference sine wave is generated at a frequency of 3Z (Hz). In other words, when Fr_cmd=3 holds, every two data items are periodically left out from the data group shown in FIG. 4A, whereby the reference sine wave is generated at a frequency three times as high as when Fr_cmd=1 holds.

Based on the above-described principle, when the frequency command value Fr_cmd=n holds, a reference sine wave value Usin_b is periodically read out from the map data shown in FIG. 4A by leaving out every n−1 data item(s), whereby the frequency of the generated reference sine wave becomes nZ (Hz). That is, when Fr_cmd=n holds, by periodically leaving out n−1 data item(s) from the data group shown in FIG. 4A, a reference sine wave having a frequency n times as high as when Fr_cmd=1 holds is generated. The above-described principle for generating the reference sine wave is summarized in a table shown in FIG. 6.

Further, the above-mentioned superposition amplitude calculation section 51 calculates a superposition amplitude A_map by searching a map, not shown, according to a voltage step-up rate R, an electric current command value Ifc_cmd, and an operation phase number Nph, which are included in the control data from the first ECU 11. In this case, the voltage step-up rate R is a rate at which the voltage Vfc generated by the fuel cell device 10 is to be increased. Further, the electric current command value Ifc_cmd corresponds to a target value of the electric current Ifc, and the operation phase number Nph corresponds to the number of the conversion sections which should be operated in the FC-VCU 20.

Then, the multiplier 57 calculates a superposition sine wave value Usin (=Usin_b·A_map) by multiplying the reference sine wave value Usin_b by the superposition amplitude A_map.

On the other hand, the aforementioned filtered value calculation section 52 (filtered value calculation means) calculates a filtered value Ifc_F using the electric current Ifc and the frequency command value Fr_cmd, by a method, described hereafter.

Specifically, the filtered value Ifc_F is calculated with a second order low-pass filter algorithm expressed by the following equations (1) to (3).

$$Y(k) = \frac{T_s}{T_s + T_d} \cdot \{x(k) + x(k-1)\} + \frac{T_d - T_s}{T_s + T_d} \cdot Y(k-1) \quad (1)$$

$$Y(k) = \text{Ifc\_F}(k) \quad (2)$$

$$x(k) = \text{Ifc}(k) \quad (3)$$

Figure 7:
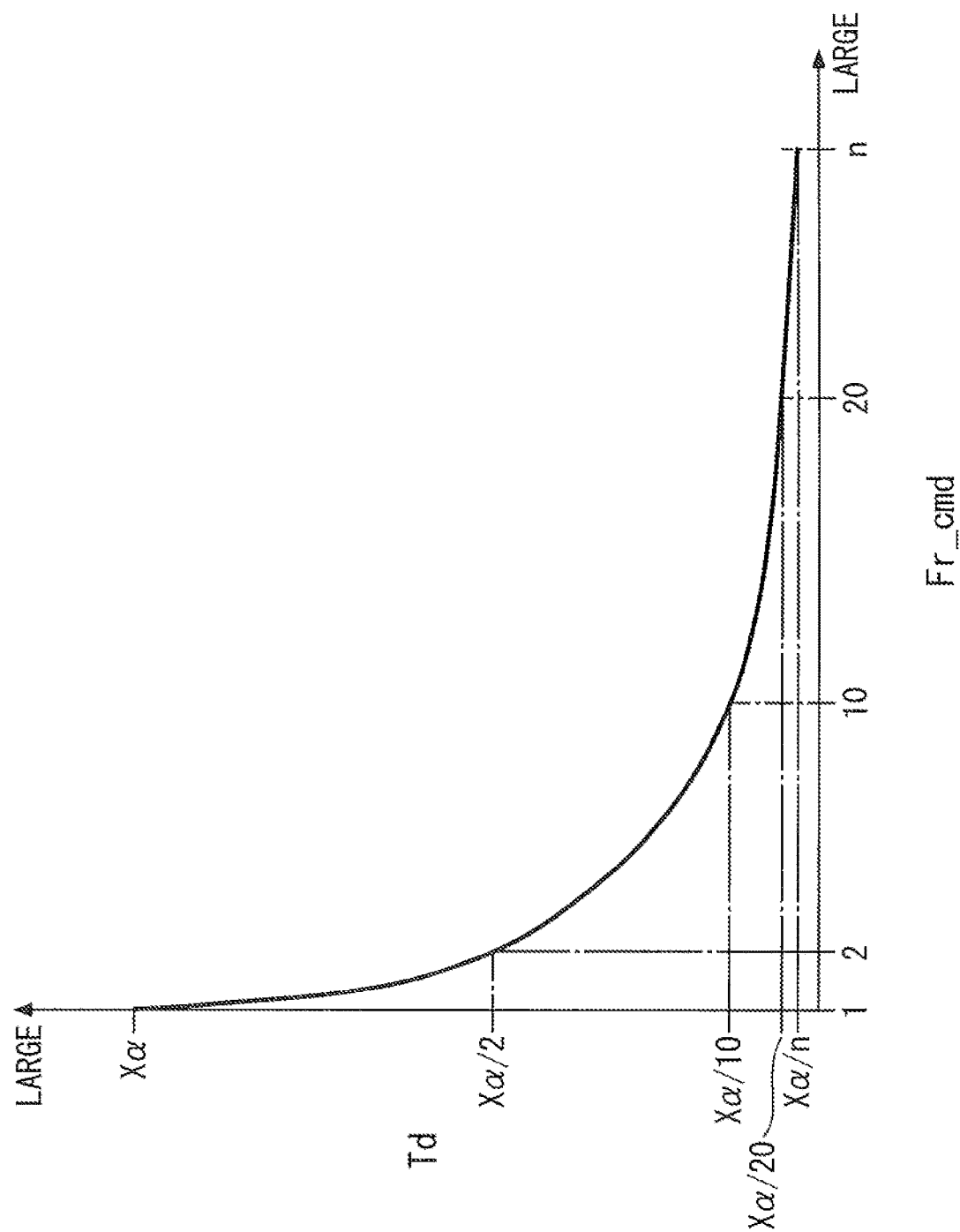
FIG. 7 is a diagram showing an example of a map for use in calculating a time constant.

In the above equation (1), $T_s$ represents a predetermined setting time. Further, $T_d$ represents a time constant, which is calculated by searching a map shown in FIG. 7 according to the frequency command value Fr_cmd. In FIG. 7, Xα represents a predetermined value. As shown in FIG. 7, as the frequency command value Fr_cmd is larger, the time constant $T_d$ is set to a smaller value in inverse proportion thereto. This is for the following reason.

To accurately extract a component ascribable to the superposition sine wave value Usin, the filtered value Ifc_F is calculated with the above-mentioned second order low-pass filter algorithm, as a value from which high-frequency noise components of the electric current Ifc have been removed. On the other hand, as mentioned above, the superposition sine wave value Usin is generated as a higher-frequency value as the frequency command value Fr_cmd is larger, and hence, the time constant $T_d$ is set to a smaller value in order to set the cut frequency of a low-pass filter to a higher value in accordance therewith. Further, by mapping the time constant $T_d$ as shown in FIG. 7, it is possible to simplify the processing.

Note that, in the above equations (1) to (3), discrete data with a symbol (k) indicates that it is data calculated (or sampled) in synchronism with the above-mentioned control period ΔTk, and the symbol k (k is a positive integer) indicates a position in the sequence of calculating cycles of respective discrete data. For example, the symbol k indicates that discrete data therewith is a value calculated at the current calculation time, and a symbol k−1 indicates that discrete data therewith is a value calculated at the immediately preceding calculation time. This also applies to discrete data referred to hereinafter.

Further, the aforementioned amplitude calculation section 53 (amplitude acquisition means) calculates an amplitude Aac using the filtered value Ifc_F and the frequency command value Fr_cmd by a method, described hereafter.

First, a slope DIfc (slope value) of the filtered value is calculated at the above-mentioned control period ΔTk by the following equation (4), and the sign of the slope DIfc is determined.

$$DIFc(k) = \frac{\text{Ifc\_F}(k) - \text{Ifc\_F}(k-1)}{\Delta Tk} \quad (4)$$

Figure 8:
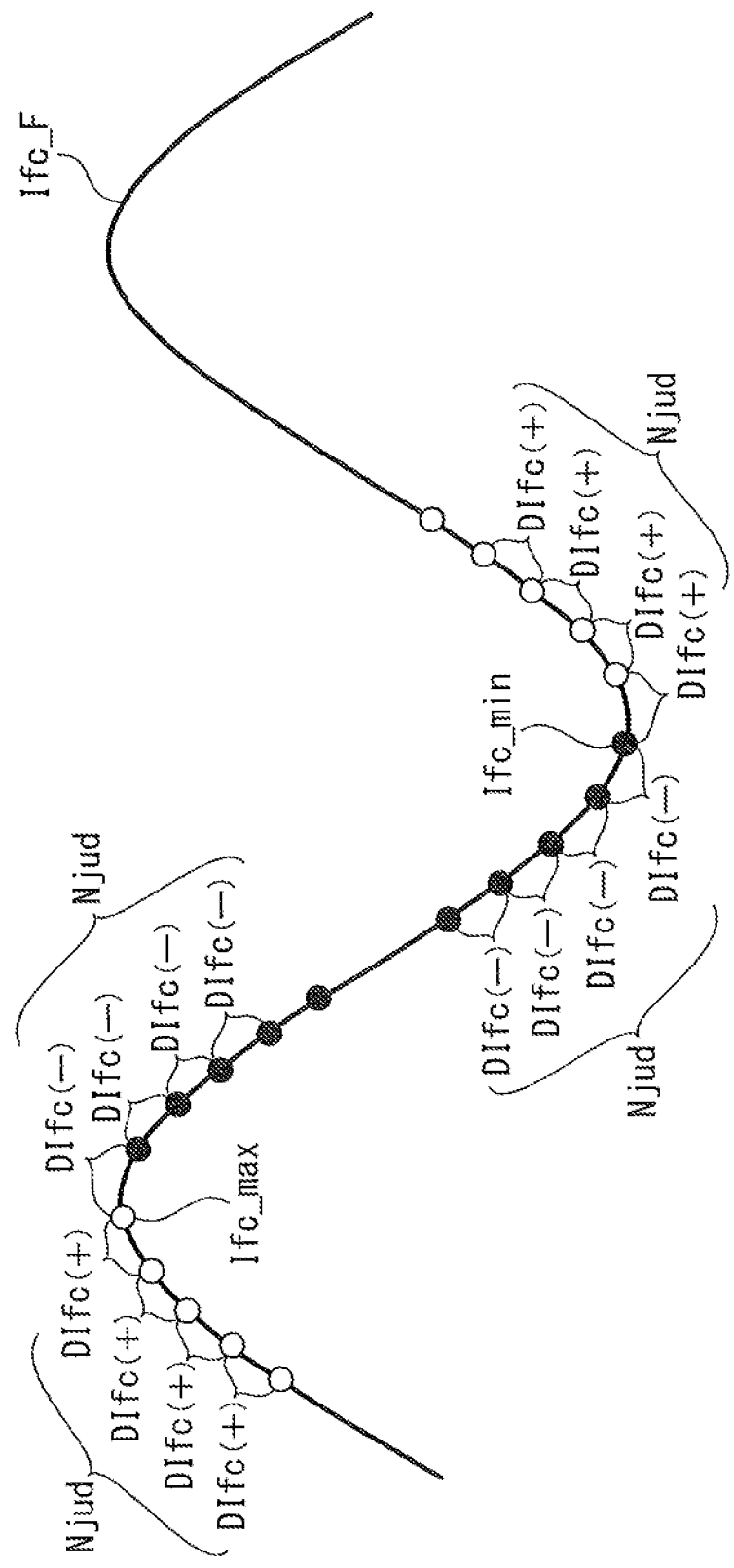
FIG. 8 is a diagram useful in explaining the principle for calculating an amplitude.

In a case where the sign of the slope DIfc is inverted, it is determined whether or not a state in which the slope DIfc has the same sign has continued before or after the sign inversion a number Njud or more times of determination. In a case where the state in which the slope DIfc has the same sign has continued before or after the sign inversion the number Njud or more times of determination (see FIG. 8), if the sign of the slope DIfc has been inverted from positive to negative, the filtered value Ifc_F at the time of the inversion is set as a maximum electric current value Ifc_max (maximum value).

As the filtered value Ifc_F at the time of the inversion for calculation of the maximum electric current value Ifc_max, there is used the larger one of the current value Ifc_F(k) and the immediately preceding value Ifc_F (k−1), appearing in the equation (4) for calculating the slope DIfc at the time of the inversion. Note that as the filtered value Ifc_F at the time of the inversion, there may be used an intermediate value of the current value Ifc_F(k) and the immediately preceding value Ifc_F (k−1) of the filtered value.

On the other hand, contrary to the above, in a case the sign of the slope DIfc is inverted from negative to positive, the filtered value Ifc_F at the time of the inversion is set as a minimum electric current value Ifc_min (minimum value). As the filtered value Ifc_F at the time of the inversion for calculation of the minimum electric current value Ifc_min, there is used the smaller one of the current value Ifc_F(k) and the immediately preceding value Ifc_F (k−1), appearing in the equation (4) for calculating the slope DIfc at the time of the inversion. Note that as the filtered value Ifc_F at the time of the inversion, there may be used an intermediate value of the current value Ifc_F(k) and the immediately preceding value Ifc_F (k−1) of the filtered value.

Figure 9:
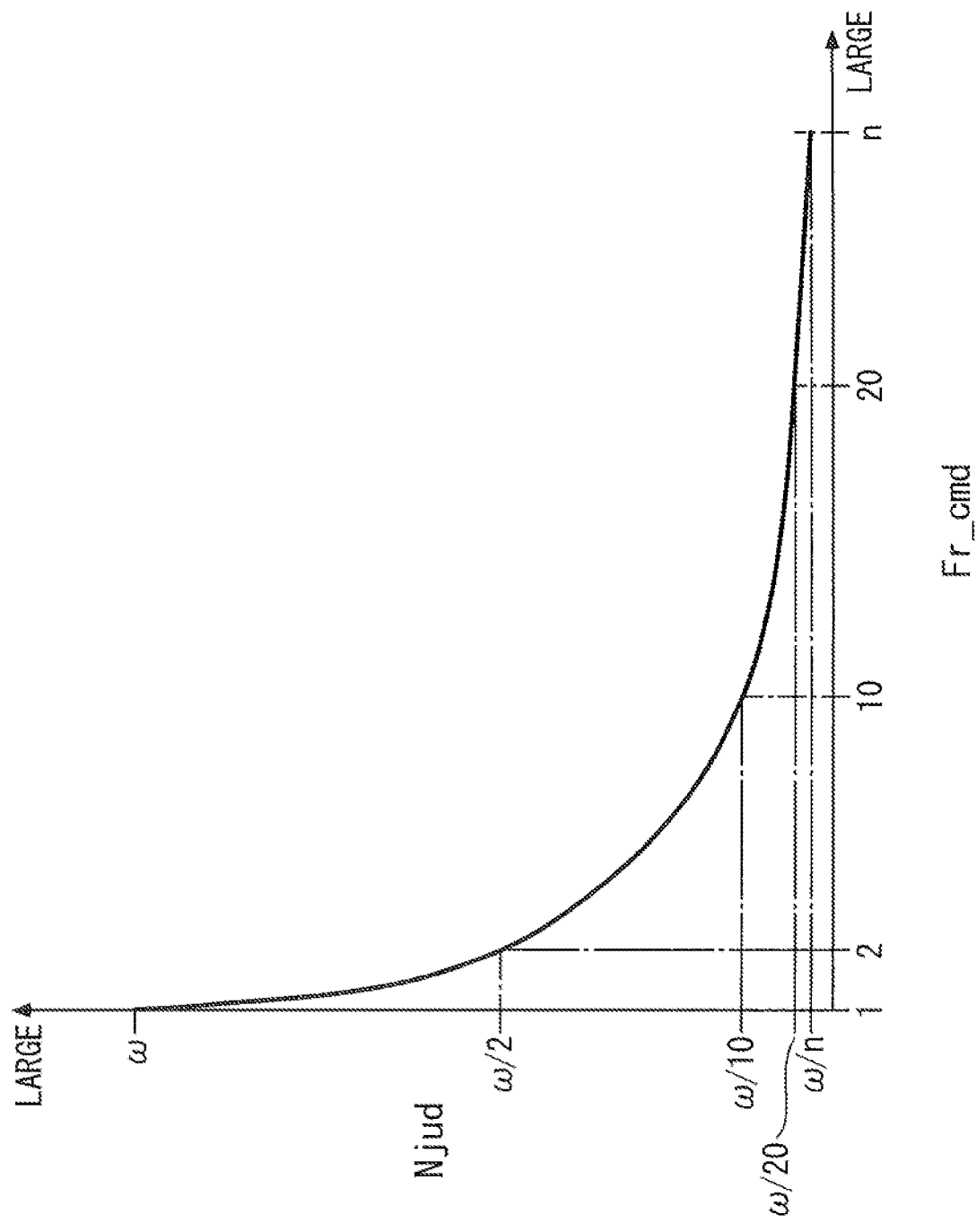
FIG. 9 is a diagram showing an example of a map for use in calculating the number of times of determination.

Further, the number Njud of times of determination is calculated by searching a map shown in FIG. 9 according to the frequency command value Fr_cmd. In FIG. 9, co represents a predetermined value. As shown in FIG. 9, as the frequency command value Fr_cmd is smaller, the number Njud of times of determination is set to a larger value in inverse proportion thereto. This is because as described hereinabove, the superposition sine wave value Usin is generated as a lower-frequency value as the frequency command value Fr_cmd is smaller, and hence the number Njud of times of determination is set to a larger number in accordance therewith.

Then, finally, the amplitude Aac is calculated by the following equation (5):

$$Aac = Ifc\_max - Ifc\_min \quad (5)$$

Further, the aforementioned subtractor 58 calculates an amplitude difference DAac (=Aac_cmd−Aac) by subtracting the amplitude Aac from the target amplitude Aac_cmd. The target amplitude Aac_cmd is set by the first ECU 11 as control data according to an operating state of the vehicle 3.

Then, the aforementioned amplitude FB controller 54 calculates an amplitude FB input Ufb_a with a predetermined feedback control algorithm (e.g. a PID control algorithm) such that the amplitude difference DAac converges to 0.

On the other hand, the above-mentioned subtractor 59 calculates a voltage difference DVfc (=Vfc_cmd−Vfc) by subtracting the voltage Vfc from the target voltage Vfc_cmd. The target voltage Vfc_cmd is set by the first ECU 11 as control data according to an operating state of the vehicle 3.

Next, the aforementioned voltage FB controller 55 calculates a voltage FB input Ufb_v with a predetermined feedback control algorithm (e.g. a PID control algorithm) such that the voltage difference DVfc converges to 0.

Further, the aforementioned adder 60 calculates a final control input Uac by the following equation (6):

$$Uac = Usin + Ufb\_a + Ufb\_v \quad (6)$$

Furthermore, the aforementioned duty signal value calculation section 56 calculates the duty signal value Uduty including a duty ratio associated with the final control input Uac e.g. by a triangular wave comparison method.

Then, the duty signal value Uduty thus calculated is supplied to the converter 22, whereby the voltage Vfc generated by the fuel cell device 10 is feedback-controlled such that it becomes equal to the target voltage Vfc_cmd, and the amplitude Aac of the electric current Ifc is feedback-controlled such that it becomes equal to the target amplitude Aac_cmd. Further, in accordance therewith, an AC current (AC signal), in which an AC component including the superposition sine wave value Usin as a component is superposed on the electric current Ifc, is generated by the converter 22 (AC superposition). Then, as will be described hereinafter, the impedance Zfc of the fuel cell device 10 is calculated by an AC impedance method based on the electric current Ifc and the voltage Vfc during execution of the AC superposition.

Next, an AC superposition control process will be described with reference to FIG. 10. The AC superposition control process calculates the duty signal value Uduty to be supplied to the converter 22 so as to cause the converter 22 to generate the AC current formed by superposing the AC component on the electric current Ifc, with a view to calculating the impedance Zfc of the fuel cell device 10. The AC superposition control process is performed by the second ECU 21 at the above-mentioned control period ΔTk. Note that various values calculated/sampled in the following description are stored in a RAM of the second ECU 21.

Figure 10:
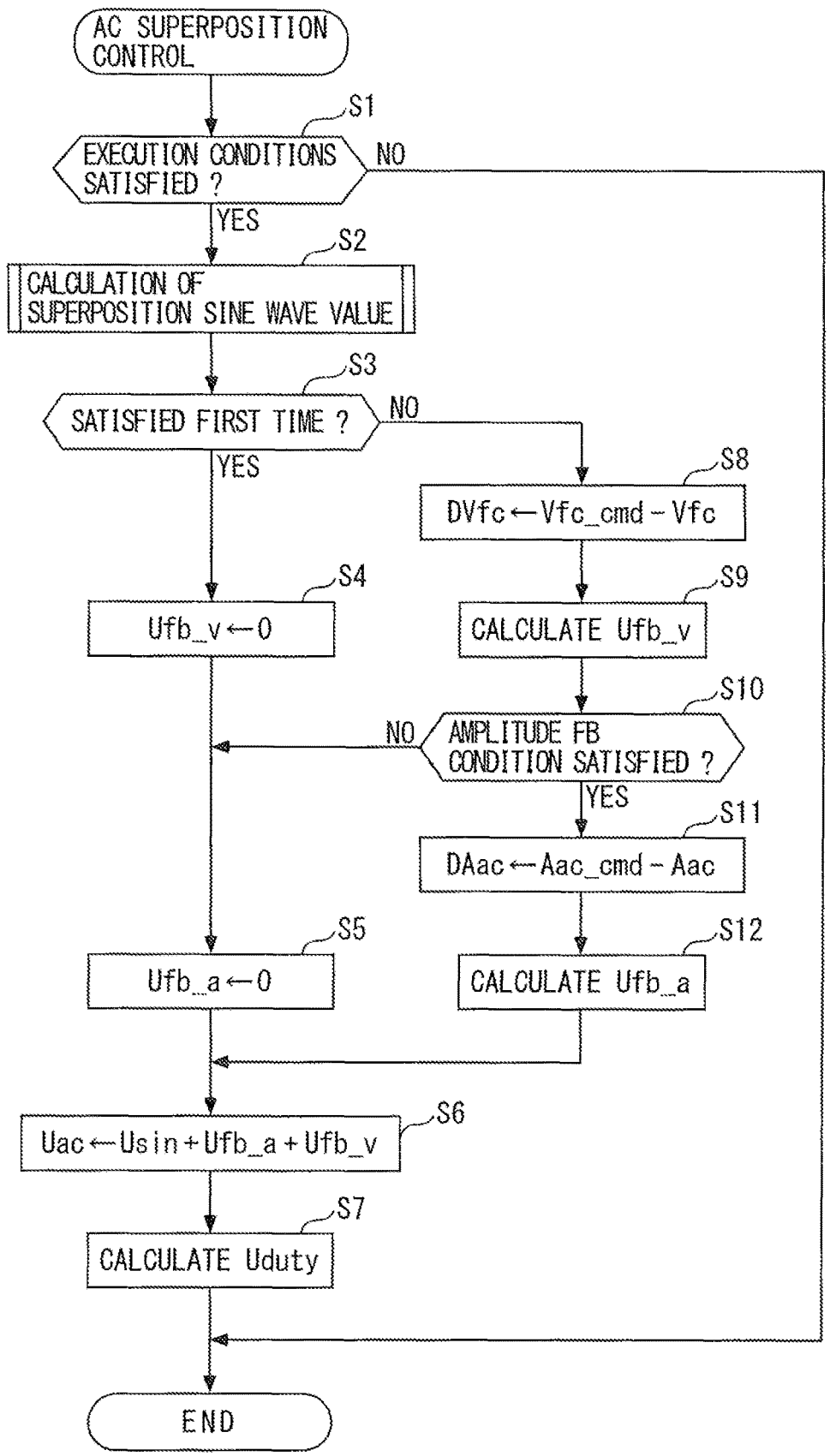
FIG. 10 is a flowchart of an AC superposition control process.

As shown in FIG. 10, first, in a step 1 (shown as S1 in abbreviated form in FIG. 10; the following steps are also shown in abbreviated form), it is determined whether or not conditions for executing the AC superposition control process are satisfied. In this case, when the fuel cell device 10 and associated components are in an operating state in which the AC superposition control process can be executed, it is determined that the conditions for executing the AC superposition control process are satisfied. If the answer to the above question is negative (NO), the present process is immediately terminated.

On the other hand, if the answer to the question of the step 1 is affirmative (YES), the process proceeds to a step 2, wherein a superposition sine wave value calculation process is executed. The superposition sine wave value calculation process calculates the superposition sine wave value Usin. Specifically, this process is executed as shown in FIG. 11.

Figure 11:
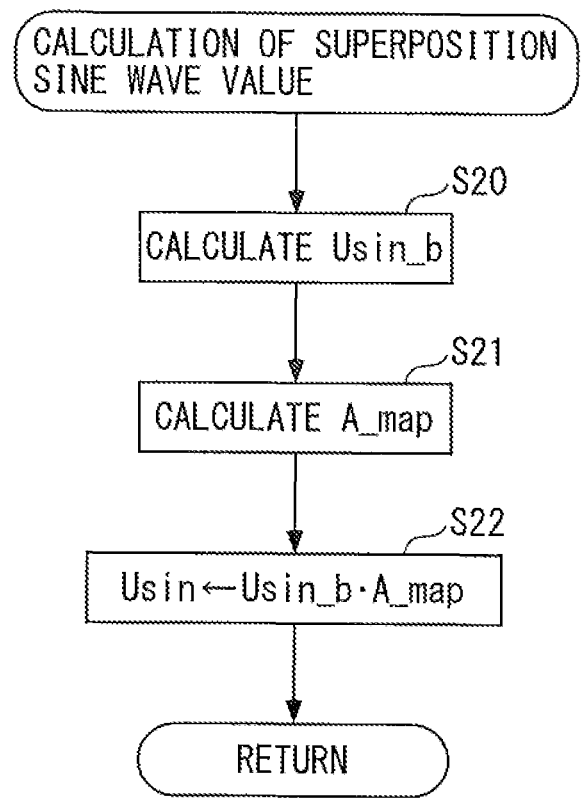
FIG. 11 is a flowchart of a superposition sine wave value calculation process.

Referring to FIG. 11, first, in a step 20, as described hereinabove, the reference sine wave value Usin_b is calculated by reading out data from the map in FIG. 4A according to the frequency command value Fr_cmd.

Then, the process proceeds to a step 21, wherein the superposition amplitude A_map is calculated by searching a map, not shown, according to the voltage step-up rate R, the electric current command value Ifc_cmd, and the operation phase number Nph, as described hereinabove.

Next, in a step 22, the superposition sine wave value Usin is set to the product of the reference sine wave value Usin_b and the superposition amplitude A_map, followed by terminating the present process.

Referring again to FIG. 10, after the superposition sine wave value Usin is thus calculated in the step 2, the AC superposition control process proceeds to a step 3, wherein it is determined whether or not the current loop is a first control time at which the conditions for executing the AC superposition control process are satisfied.

If the answer to the question of the step 3 is affirmative (YES), i.e. if the current loop is the first control time at which the conditions for executing the AC superposition control process are satisfied, the process proceeds to a step 4, wherein the voltage FB input Ufb_v is set to 0.

Then, the process proceeds to a step 5, wherein the amplitude FB input Ufb_a is set to 0, and then the process proceeds to a step 6, wherein the final control input Uac is set to the sum of the superposition sine wave value Usin, the voltage FB input Ufb_v, and the amplitude FB input Ufb_a.

Next, in a step 7, the duty signal value Uduty is calculated by searching a map, not shown, according to the final control input Uac, followed by terminating the present process.

On the other hand, if the answer to the question of the above-described step 3 is negative (NO), i.e. if the conditions for executing the AC superposition control process were satisfied at the immediately preceding or earlier control time, the process proceeds to a step 8, wherein the voltage difference DVfc is set to a difference (Vfc_cmd−Vfc) between the target voltage Vfc_cmd and the voltage Vfc.

Then, the process proceeds to a step 9, wherein the voltage FB input Ufb_v is calculated with a predetermined feedback control algorithm such that the voltage difference DVfc converges to 0.

Next, in a step 10, it is determined whether or not an amplitude FB condition is satisfied. In this case, the present time is after the update of the amplitude Aac has been performed in a step 42, referred to hereinafter, it is determined that the amplitude FB condition is satisfied. If the answer to the question of the step 10 is negative (NO), the steps 5 to 7 are executed, as described hereinabove, followed by terminating the present process.

On the other hand, if the answer to the question of the step 10 is affirmative (YES), i.e. if the amplitude FB condition is satisfied, the process proceeds to a step 11, wherein the amplitude difference DAac is set to a difference (Aac_cmd−Aac) between the target amplitude Aac_cmd and the amplitude Aac.

Then, the process proceeds to a step 12, wherein the amplitude FB input Ufb_a is calculated with a predetermined feedback control algorithm such that the amplitude difference DAac converges to 0.

Next, the steps 6 and 7 are executed, as described above, followed by terminating the present process. As described hereinabove, when the AC superposition control process is performed, the duty signal value Uduty is supplied to the converter 22, whereby the voltage Vfc generated by the fuel cell device 10 is feedback-controlled such that it becomes equal to the target voltage Vfc_cmd, and the amplitude Aac of the electric current Ifc is feedback-controlled such that it becomes equal to the target amplitude Aac_cmd. Further, in accordance therewith, the AC current, in which the AC component including the superposition sine wave value Usin as a component is superposed on the electric current Ifc, is generated by the converter 22 (AC superposition).

Next, an amplitude calculation process will be described with reference to FIG. 12. The amplitude calculation process calculates the amplitude Aac of the electric current Ifc from the fuel cell device 10, and is performed by the second ECU 21 at the above-mentioned control period ΔTk.

Figure 12:
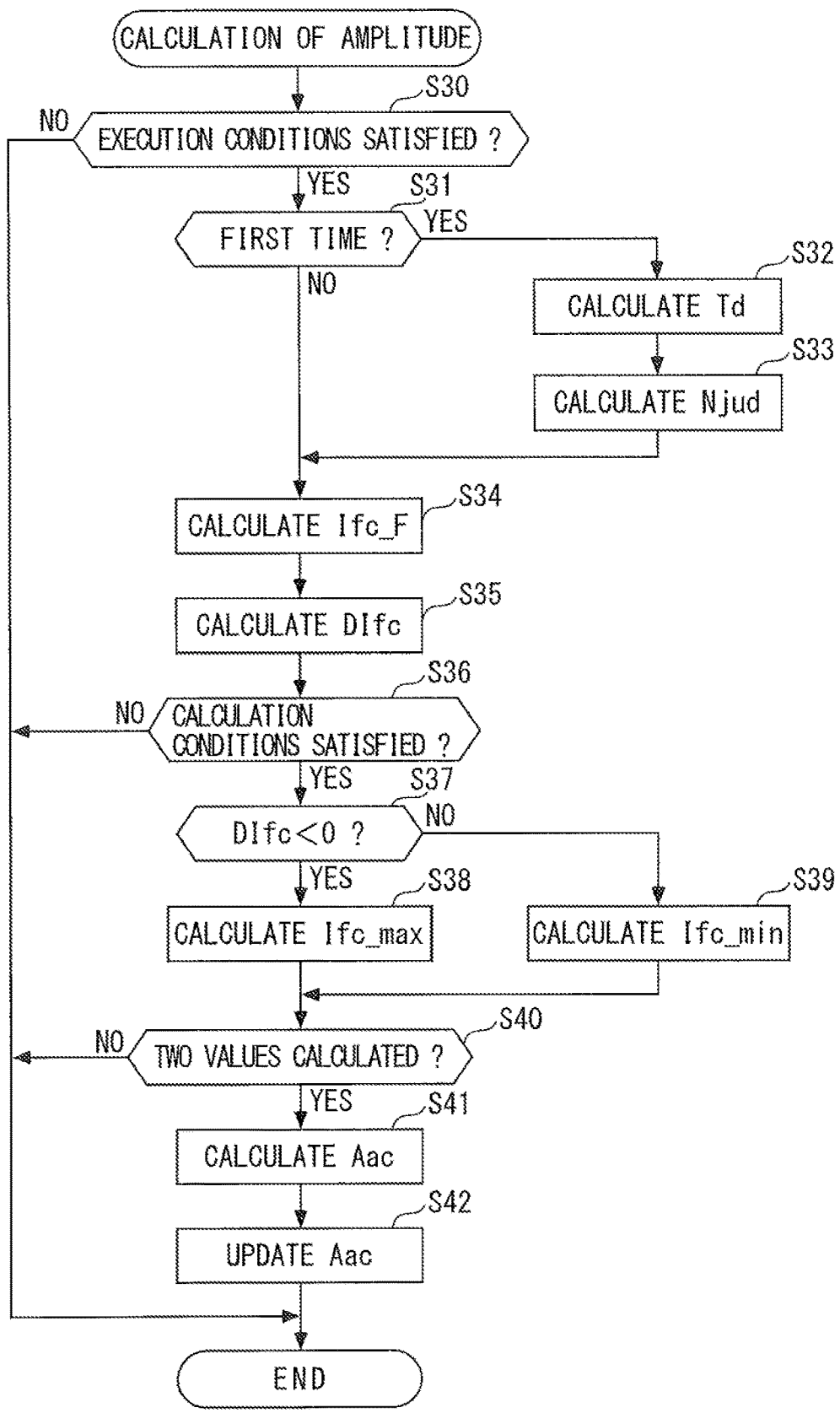
FIG. 12 is a flowchart of an amplitude calculation process.

As shown in FIG. 12, first, in a step 30, it is determined whether or not conditions for executing the amplitude calculation process are satisfied. In this case, for example, when the above-described AC superposition control process is being executed, and a time period elapsed from the start of execution of the process is not shorter than a predetermined value, it is determined that the conditions for executing the amplitude calculation process are satisfied. If the answer to this question is negative (NO), the present process is immediately terminated.

On the other hand, if the answer to the question of the step 30 is affirmative (YES), i.e. if the conditions for executing the amplitude calculation process are satisfied, the process proceeds to a step 31, wherein it is determined whether or not the current loop is a first control time at which the conditions for executing the AC superposition control process are satisfied. If the answer to this question is negative (NO), i.e. if the conditions for executing the amplitude calculation process were satisfied at the immediately preceding or earlier control time, the process proceeds to a step 34, referred to hereinafter.

On the other hand, if the answer to the question of the step 31 is affirmative (YES), i.e. if the current loop is the first control time at which the conditions for executing the AC superposition control process are satisfied, the process proceeds to a step 32, wherein the time constant $T_d$ is calculated by searching the map described hereinabove with reference to FIG. 7 according to the frequency command value Fr_cmd.

Then, the process proceeds to a step 33, wherein the number Njud of times of determination is calculated by searching the map described hereinabove with reference to FIG. 9 according to the frequency command value Fr_cmd.

In the step 34 following the above step 31 or 33, the filtered value Ifc_F is calculated by the aforementioned equations (1) to (3).

Then, the process proceeds to a step 35, wherein the slope DIfc is calculated by the aforementioned equation (4).

Next, in a step 36, it is determined whether or not conditions for calculating the amplitude Aac are satisfied. In this case, when conditions (f1) to (f3), described hereinafter, are all satisfied, it is determined that the conditions for calculating the amplitude Aac are satisfied.

(f1) The sign of the slope DIfc has been inverted.

(f2) The results of calculation of the slope DIfc performed before inversion of the sign of the slope DIfc show that each calculated value continued to have the same sign the number Njud or more times of determination.

(f3) The results of calculation of the slope DIfc performed after inversion of the sign of the slope DIfc show that each calculated value continues to have the same sign the number Njud or more times of determination.

If the answer to the question of the above step 36 is negative (NO), the present process is immediately terminated. On the other hand, if the answer to the question of the step 36 is affirmative (YES), i.e. if the conditions for calculating the amplitude Aac are satisfied, the process proceeds to a step 37, wherein it is determined whether or not DIfc<0 holds.

If the answer to this question is affirmative (YES), i.e. if the slope DIfc is a negative value, the process proceeds to a step 38, wherein the maximum electric current value Ifc_max is calculated. Specifically, as described hereinbefore, the filtered value Ifc_F at the time of inversion of the sign of the slope DIfc is set as the maximum electric current value Ifc_max.

On the other hand, if the answer to the question of the step 37 is negative (NO), i.e. if the slope DIfc is a positive value, the process proceeds to a step 39, wherein the minimum electric current value Ifc_min is calculated. Specifically, as described hereinbefore, the filtered value Ifc_F at the time of inversion of the sign of the slope DIfc is set as the minimum electric current value Ifc_min.

In a step 40 following the step 38 or 39, it is determined whether or not the two values Ifc_max and Ifc_min have already been calculated. If the answer to this question is negative (NO), the present process is immediately terminated.

On the other hand, if the answer to the question of the step 40 is affirmative (YES), i.e. if the two values Ifc_max and Ifc_min have already been calculated, the process proceeds to a step 41, wherein the amplitude Aac is calculated by the above-mentioned equation (5).

Next, in the step 42, the amplitude Aac in the RAM is updated to the value calculated in the step 41, followed by terminating the present process.

Next, an impedance calculation process will be described with reference to FIG. 13. The impedance calculation process calculates the impedance Zfc of the fuel cell stack of the fuel cell device 10, and is performed by the second ECU 21 at the above-mentioned control period ΔTk.

Figure 13:
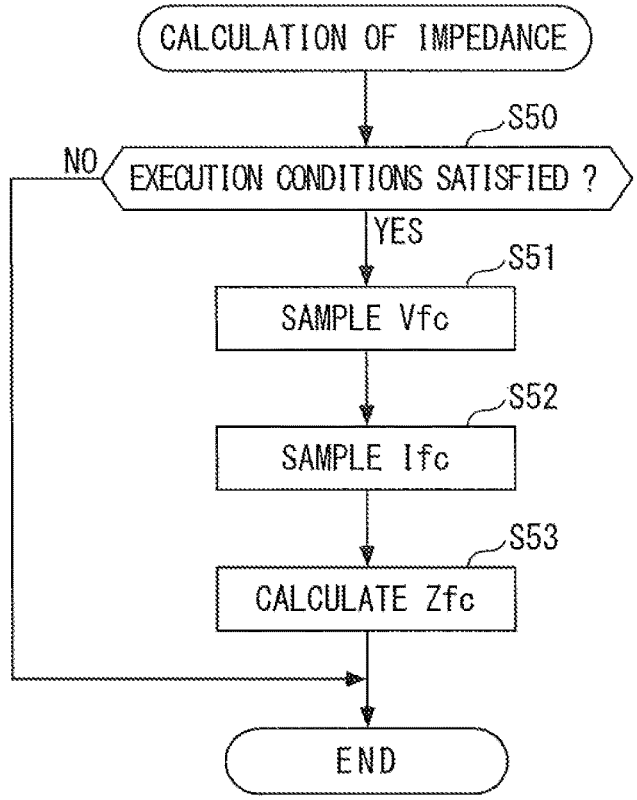
FIG. 13 is a flowchart of an impedance calculation process.

As shown in FIG. 13, first, in a step 50, it is determined whether or not conditions for executing the impedance calculation process are satisfied. In this case, for example, when the above-described AC superposition control process is being executed, and a time period elapsed from the start of execution of the process is not shorter than a predetermined value, it is determined that the conditions for executing the impedance calculation process are satisfied. If the answer to this question is negative (NO), the present process is immediately terminated.

On the other hand, if the answer to the question of the step 50 is affirmative (YES), i.e. if the conditions for executing the impedance calculation process are satisfied, the process proceeds to a step 51, wherein the voltage Vfc is sampled.

Then, the process proceeds to a step 52, wherein the electric current Ifc is sampled.

In a step 53 following the step 52, the impedance Zfc is calculated by the AC impedance method based on the voltage Vfc and the electric current Ifc, followed by terminating the present process. The impedance Zfc thus calculated is output from the second ECU 21 to the first ECU 11.

Next, an FC humidification control process will be described with reference to FIG. 14. The FC humidification control process controls the amount of hydrogen to be supplied to the fuel cell stack via the hydrogen pump, and the amount of air to be supplied to the fuel cell stack via the air pump, and is executed by the first ECU 11 at a predetermined control period.

Figure 14:
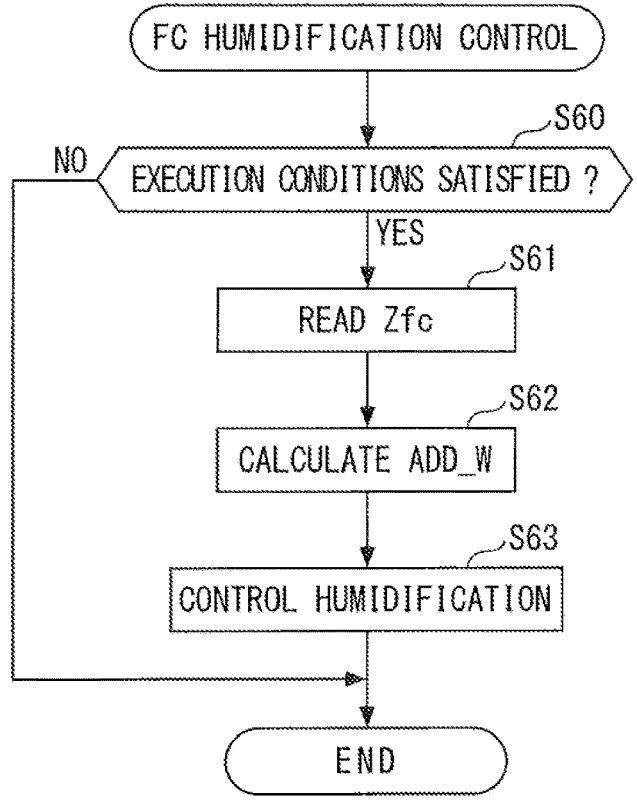
FIG. 14 is a flowchart of an FC humidification control process.

As shown in FIG. 14, first, in a step 60, it is determined whether or not conditions for executing the FC humidification control process are satisfied. The determination of whether or not the conditions for executing the FC humidification control process are satisfied is performed based on the operating states of the fuel cell device 10 and the vehicle 3. If the answer to this question is negative (NO), the present process is immediately terminated.

On the other hand, if the answer to the question of the step 60 is affirmative (YES), i.e. if the conditions for executing the FC humidification control process are satisfied, the process proceeds to a step 61, wherein the impedance Zfc input from the second ECU 21 is read in.

Then, the process proceeds to a step 62, wherein a humidification amount ADD_W is calculated such that the impedance Zfc becomes equal to a target value Zfc_cmd of the impedance.

Next, in a step 63, humidification control processing is executed. Specifically, a control input value is calculated by searching a map, not shown, according to the humidification amount ADD_W, and control input signals associated with the control input value are supplied to the hydrogen pump and the air pump, respectively, whereby the impedance Zfc of the fuel cell stack is controlled such that it becomes equal to the target value Zfc_cmd. After the humidification control processing is executed in the step 63 as described above, the present process is terminated.

As described heretofore, according to the control apparatus 1 of the present embodiment, the reference sine wave value calculation section 50 is configured to be capable of calculating n reference sine wave values Usin_b that have n frequencies Z (Hz) to nZ (Hz) different from each other, respectively, by using the data group of one set of data items of the reference sine wave value map (see FIG. 4A) stored in the ROM of the second ECU 21. Further, the reference sine wave value calculation section 50 selectively calculates a reference sine wave value Usin_b having one of the frequencies Z to nZ (Hz), based on the frequency command value Fr_cmd. In doing this, when Fr_cmd=1 holds, data is read out from the reference sine wave value map, as it is, whereby the reference sine wave value Usin_b having the frequency of Z (Hz) is calculated. Further, when Fr_cmd=2 to n holds, by periodically leaving out 1 to n−1 data item(s) from the data group shown in FIG. 4A, a reference sine wave value Usin_b having a frequency of 2 to n times as high as when Fr_cmd=1 holds is generated. This makes it possible to reduce computational load for calculating the n reference sine wave values Usin_b.

In addition to this, since the ROM of the second ECU 21 is only required to have a capacity capable of storing only the data group of one set of data items of the reference sine wave value map, it is possible to reduce the storage capacity thereof. Further, in a case where the functions of the control apparatus 1 are ported to another control apparatus, it is not required to port a large number of data items, whereby it is possible to easily port the functions, and hence the versatility can be enhanced. From the above, it is possible to enhance the versatility and calculate the reference sine wave values Usin_b having the n frequencies different from each other, while reducing the computational load and the storage capacity. This makes it possible to improve marketability.

Further, during execution of the AC superposition control process, the superposition sine wave value Usin is calculated by multiplying the reference sine wave value Usin_b by the superposition amplitude A_map, and the duty signal value Uduty calculated using the superposition sine wave value Usin is supplied to the converter 22, whereby AC current formed by superposing an AC component, which includes the superposition sine wave value Usin as a component, on the electric current Ifc is generated by the converter 22. Then, in this state, the electric current Ifc generated by the fuel cell device 10 is detected by the current sensor 23, and the filtered value Ifc_F is calculated by applying the second order low-pass filter algorithm expressed by the equations (1) to (3) to the electric current Ifc.

In this case, the time constant $T_d$ used in the second order low-pass filter algorithm is calculated by searching the map described hereinabove with reference to FIG. 7 according to the frequency command value Fr_cmd, and hence the cut frequency of the second order low-pass filter is set to a value in a higher-frequency range as the frequency command value Fr_cmd is larger. That is, since the cut frequency of the low-pass filter is set to a higher value as the frequency of the superposition sine wave value Usin is higher, it is possible to calculate the filtered value Ifc_F as a value obtained by efficiently extracting only a component ascribable to the superposition sine wave value Usin from the electric current Ifc, while properly cutting high-frequency noise components therefrom.

Further, the maximum electric current value Ifc_max and the minimum electric current value Ifc_min of the filtered value Ifc_F are calculated using the slope DIfc of the filtered value Ifc_F, and the amplitude Aac is calculated by subtracting the minimum electric current value Ifc_min from the maximum electric current value Ifc_max. In this case, after the slope DIfc has been inverted from a positive value to a negative value from a state in which the slope DIfc continued to be positive the number Njud or more times of determination, when the slope DIfc continues to be negative the number Njud or more times of determination, the filtered value Ifc_F at the time of the inversion of the sign of the slope DIfc is set as the maximum electric current value Ifc_max. Contrary to the above, after the slope DIfc has been inverted from a negative value to a positive value from a state in which the slope DIfc continued to be negative the number Njud or more times of determination, when the slope DIfc continues to be positive the number Njud or more times of determination, the filtered value Ifc_F at the time of the inversion of the sign of the slope DIfc is set as the minimum electric current value Ifc_min. As shown in FIG. 9, the number Njud of times of determination is set to a larger value as the frequency command value Fr_cmd is smaller, i.e. the frequency of the superposition sine wave value Usin is lower, and hence it is possible to accurately acquire the amplitude Aac according to the frequency of the superposition sine wave value Usin.

Furthermore, the amplitude FB input Ufb_a is calculated such that the amplitude Aac becomes equal to the target amplitude Aac_cmd, and the fuel cell device 10 is controlled using the amplitude FB input Ufb_a. As described above, by using the accurately calculated filtered value Ifc_F and amplitude Aac, it is possible to control the fuel cell device 10, whereby it is possible to improve control accuracy thereof.

Further, the impedance Zfc is calculated by selectively using one of the reference sine wave values Usin_b, having one of the frequencies Z to nZ (Hz), so that by selecting a reference sine wave value Usin_b having a frequency suitable for calculating the impedance Zfc, it is possible to improve the calculation accuracy of the impedance Zfc. As a consequence, the control accuracy of the fuel cell device 10 can be improved.

Note that although in the present embodiment, the fuel cell device 10 is used as a vehicle plant, by way of example, the vehicle plant of the present invention is not limited to this, but any suitable vehicle plant may be used insofar as it is installed on a vehicle. For example, a prime mover may be used as the vehicle plant.

Further, although in the present embodiment, the electric current Ifc or the impedance Zfc is used as an operating state parameter, by way of example, the operating state parameter of the present invention is not limited to this, but any suitable operating state parameter may be used insofar as it represents an operating state of the vehicle plant. For example, in a case where an internal combustion engine is used as the vehicle plant, an air-fuel ratio of exhaust gases discharged from the engine or torque generated by the engine may be used.

Furthermore, although in the present embodiment, a predetermined filtering process is performed using the second order low-pass filter algorithm expressed by the equations (1) to (3), by way of example, the predetermined filtering process of the present invention is not limited to this, but any suitable filtering process may be performed insofar as it includes a predetermined passband. For example, a first order low-pass filter algorithm or a band-pass filter algorithm may be used. In this case, it is only required to set the cut frequency of the first order low-pass filter algorithm or an upper limit value of the passband of the band-pass filter algorithm to a higher frequency as the frequency command value Fr_cmd is larger.

On the other hand, although in the present embodiment, the slope DIfc is used as a slope value, by way of example, the slope value of the present invention is not limited to this, but any suitable slope value may be used insofar as it represents a slope. For example, a difference [Ifc_F(k)–Ifc_F(k–1)] between the current value and the immediately preceding value of the filtered value may be used as the slope value in place of the slope DIfc.

Further, the slope DIfc as the slope value may be calculated by substituting the electric current Ifc for the filtered value Ifc_F in the aforementioned equation (4).

Furthermore, although in the present embodiment, the reference sine wave value Usin_b is used as a periodic function value, by way of example, a cosine wave value obtained by shifting the phase by 90° with respect to the reference sine wave value Usin_b may be used in place of the reference sine wave value Usin_b.

On the other hand, although in the present embodiment, the fuel cell device 10 is applied to a four-wheel vehicle, the fuel cell device 10 may be applied to a vehicle with three or less wheels or a vehicle with five or more wheels in place of the four-wheel vehicle.

Further, although in the present embodiment, the impedance Zfc of the whole fuel cell stack of the fuel cell device 10 is calculated using one current sensor 23 and one voltage sensor 24, a plurality of current sensors and/or a plurality of voltage sensors may be used so as to measure impedances of a plurality of portions of the fuel cell stack.

With the above-described configuration, when a problem has occurred with any of the plurality of portions of the fuel cell stack, it is possible to properly identify the portion with which the problem has occurred, using the plurality of impedances. Further, for example, the FC humidification control process may be executed such that an average value of the impedances of the plurality of portions becomes equal to the target value Zfc_cmd.

Furthermore, although in the present embodiment, the impedance Zfc is calculated by the second ECU 21, and the calculated impedance Zfc is output to the first ECU 11, the impedance Zfc may be calculated by the first ECU 11 using the electric current Ifc and the voltage Vfc. Further, although in the present embodiment, voltage feedback control (steps 6 and 7) is performed using the voltage Vfc and the target voltage Vfc_cmd, electric current feedback control may be performed using the electric current Ifc and the electric current command value Ifc_cmd.

It is further understood by those skilled in the art that the foregoing are preferred embodiments of the invention, and that various changes and modifications may be made without departing from the spirit and scope thereof.

What is claimed is:

1. A control apparatus for a vehicle plant installed on a vehicle, comprising:
   storage means for storing a data group of one set of reference periodic function values having a predetermined reference frequency;
   periodic function value generation means configured to be capable of generating n periodic function values having n frequencies (n represents an integer), which are an integer times as high as the reference frequency and different from each other, using the data group of the one set of reference periodic function values stored in the storage means, the periodic function value generation means selectively generating one of the n periodic function values as a selected periodic function value;

electric signal generation means electrically connected to the vehicle plant, for generating an electric signal including the selected periodic function value as a component, using an output from the vehicle plant;

operating state parameter acquisition means for acquiring an operating state parameter indicative of an operating state of the vehicle plant at a time when the electric signal is being generated; and control means for controlling the vehicle plant using the operating state parameter, wherein the periodic function value generation means generates one of the n periodic function values by using the data group of the one set of reference periodic function values as it is, and generates n−1 periodic function values other than the one periodic function value by periodically thinning out data from the data group of the one set of reference periodic function values, in accordance with the frequency of the selected one of the n−1 periodic function values.

2. The control apparatus according to claim 1, wherein the electric signal is configured as an AC signal, and wherein the operating state parameter is an AC signal value output from the vehicle plant, the control apparatus further comprising filtered value calculation means for calculating a filtered value by performing a predetermined filtering process on the AC signal value, wherein the control means controls the vehicle plant by using the filtered value, and wherein the predetermined filtering process is configured to include a predetermined passband, with an upper limit value of the predetermined passband being set such that the upper limit value has a higher frequency as a frequency of the selected periodic function value is higher.

3. The control apparatus according to claim 1, wherein periodic function values are configured as sine function values or cosine function values, wherein the electric signal is configured as an AC signal, and wherein the operating state parameter is an AC signal value output from the vehicle plant, the control apparatus further comprising amplitude acquisition means for acquiring an amplitude of the AC signal value based on a slope value representing a slope of the AC signal value, wherein the control means controls the vehicle plant by using the amplitude, and wherein after a sign of the slope represented by the slope value has been inverted from a state in which the slope continued to have the same sign a predetermined number of times or more, when the slope having the inverted sign continues the predetermined number of times or more, the amplitude acquisition means sets an AC signal value at a time of inversion of the sign as one of a maximum value and a minimum value based on a direction of the inversion of the sign, acquires the amplitude as a difference between the maximum value and the minimum value, and sets the predetermined number of times to a smaller value as the frequency of the selected periodic function value is higher.

4. The control apparatus according to claim 1, wherein the vehicle plant is a fuel cell device, wherein the electric signal generation means generates an AC signal as the electric signal, wherein the operating state parameter acquisition means acquires impedance of a fuel cell stack when the AC signal is being generated, as the operating state parameter, and wherein the control means controls the fuel cell device such that the impedance becomes equal to a predetermined target value.

5. The control apparatus according to claim 4, wherein the operating state parameter acquisition means acquires a plurality of the impedances of a plurality of portions of the fuel cell stack, respectively, when the AC signal is being generated.

6. The control apparatus according to claim 1, wherein the n−1 periodic function values other than the one periodic function value are generated by periodically thinning out a predetermined number P (P represents an integer larger than zero) of data from the data group of the one set of reference periodic function values.

7. The control apparatus according to claim 6, wherein the n−1 periodic function values other than the one periodic function value are generated by incrementing the predetermined number P.

* * * * *